(12) United States Patent
Ungerleider et al.

(10) Patent No.: US 8,171,751 B1
(45) Date of Patent: May 8, 2012

(54) FOAMED GLASS COMPOSITE MATERIAL AND A METHOD OF PRODUCING SAME

(76) Inventors: Andrew Ungerleider, Sante Fe, NM (US); W. Gene Ramsey, Las Cruces, NM (US)

(*) Notice: Subject to any disclaimer, the term of this patent is extended or adjusted under 35 U.S.C. 154(b) by 7 days.

(21) Appl. No.: 12/482,967

(22) Filed: Jun. 11, 2009

Related U.S. Application Data

(63) Continuation-in-part of application No. 11/276,193, filed on Feb. 17, 2006, now abandoned.

(51) Int. Cl.
*C03B 19/08* (2006.01)
*C03B 19/09* (2006.01)

(52) U.S. Cl. .................. 65/21.5; 65/19; 65/21.1; 65/22

(58) Field of Classification Search .................. 65/19–22
See application file for complete search history.

(56) References Cited

U.S. PATENT DOCUMENTS

| | | | | |
|---|---|---|---|---|
| 1,746,860 A | * | 2/1930 | Lloyd | 501/82 |
| 2,237,032 A | * | 4/1941 | Haux | 65/111 |
| 3,054,139 A | * | 9/1962 | Bartholomew et al. | 65/19 |
| 3,109,727 A | * | 11/1963 | Miller | 65/19 |
| 3,174,870 A | * | 3/1965 | Connelly et al. | 501/84 |
| 3,321,414 A | * | 5/1967 | Vieli | 521/188 |
| 3,459,565 A | * | 8/1969 | Jones et al. | 501/39 |
| 3,505,089 A | * | 4/1970 | Rostoker | 501/84 |
| 4,049,439 A | * | 9/1977 | Nakamura et al. | 65/19 |
| 4,086,098 A | * | 4/1978 | Le Ruyet et al. | 106/668 |
| 4,143,202 A | * | 3/1979 | Tseng et al. | 428/406 |
| 4,198,224 A | * | 4/1980 | Kirkpatrick | 65/22 |
| 4,441,905 A | * | 4/1984 | Malmendier et al. | 65/21.3 |
| 5,928,773 A | * | 7/1999 | Andersen | 428/305.5 |

* cited by examiner

*Primary Examiner* — Joseph Del Sole
*Assistant Examiner* — Scott W Dodds
(74) *Attorney, Agent, or Firm* — Brannon Robinson Sowers Hughel & Doss PC

(57) ABSTRACT

A method of making a foamed glass composite, including crushing a vitreous precursor material, such as waste glass, frit, metallurgical slag or the like, sizing the crushed vitreous precursor to segregate an amount of crushed particles of a predetermined size and pelletizing the crushed particles. The pellets are preheated and passed through a high-temperature zone to foam the pellets. The foamed pellets are rapidly quenched to a temperature below their dilatometric softening point and then cooled to room temperature. The high temperature zone is at least about 1200° C. and the pellets are preheated to within no more than about 25° C. of their dilatometric softening point. The pellets are quenched to partially or completely avoid annealing and have increased hardness and compressive strength as a consequence, as well as a preferred failure mode under compression and torsional loads of crushing/shattering.

19 Claims, 2 Drawing Sheets

FOAMED GLASS COMPOSITE MATERIAL AND A METHOD OF PRODUCING SAME

CROSS-REFERENCE TO RELATED APPLICATIONS

This patent application claims priority to co-pending U.S. patent application Ser. No. 11/276,193 filed on Feb. 17, 2006.

TECHNICAL FIELD

The invention relates generally to the field of ceramic materials and specifically, to a composite ceramic material including a foamed glass or foamed silaceous slag portion and a cementitious, concrete, gypsum or other ceramic portion, and method of making the same.

BACKGROUND

Foamed glass is an established lightweight ceramic material. Typically, foamed glass is made in one of two ways. The first way involves preparing a stable foam from water and foaming agent, preparing a wet mixture or slurry of solid components (where cement is the main substance), quick mixing the foam and the slurry, filling molds with prepared the mixed foam/slurry, and firing the same. The second way to make foamed glass involves making use of the property of some materials to evolve a gas when heated. A foamed glass material may be prepared by mixing crushed vitreous particles and a foaming agent (such as $CaCO_3$ or $CaSO_4$), placing the mixture in a mold, heating the mold (such as by passing the mold through a furnace) to a foaming temperature, and cooling the mold to produce foamed glass bodies.

Slag is a nonmetallic byproduct of metallurgical operations. Slags typically consist of calcium, magnesium, and aluminum silicates in various combinations. Iron and steel slags are byproducts of iron and steel production. For example, an iron blast furnace is typically charged with iron ore, fluxing agents (such as limestone or dolomite) and coke (as fuel and reducing agent). Iron ore is typically a mixture of iron oxides, silica, and alumina. When sufficiently heated, molten slag and iron are produced. Upon separation of the iron, the slag is left over. The slag occurs as a molten liquid melt and is a complex solution of silicates and oxides that solidifies upon cooling.

The physical properties of the slag, such as its density, porosity, mean particle size, particle size distribution, and the like are affected by both its chemical composition and the rate at which it was cooled. The types of slag produced may thus conveniently be classified according to the cooling method used to produce them—air cooled, expanded, and granulated. Each type of slag has different properties and, thus, different applications.

While useful as insulation, roadway fill and abrasive materials, foamed glass bodies (with or without foamed slag), are typically unsuitable for use as lightweight filler due to cost and their propensity to hydrate and expand. Thus, there remains a need for an easily produced foamed glass material that is more resistant to expansion from hydration and/or more easily aged. The present invention addresses this need.

SUMMARY

The technology discussed below relates to manufactured composite materials, such as acoustic tile and manufactured stone, from foamed glass and (typically gypsum based) cementitious or other ceramic materials, and the method for making the same. One object of the present invention is to provide an improved foamed glass-containing material. Related objects and advantages of the present invention will be apparent from the following description.

DETAILED DESCRIPTION OF THE PREFERRED EMBODIMENTS

Figure 1:
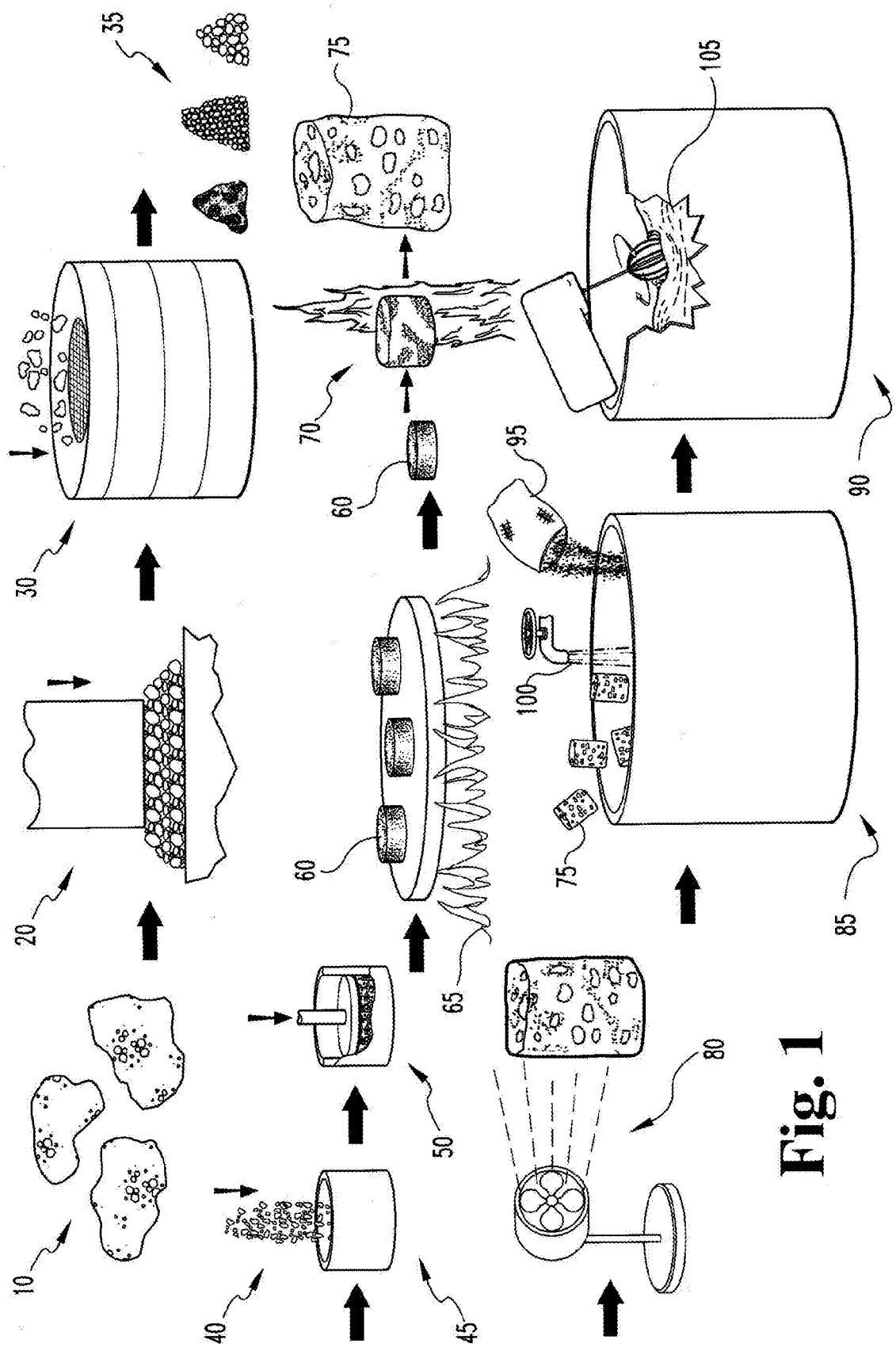
FIG. 1 is a schematic view of a first embodiment of a process for making foamed glass composites.
Figure 2:
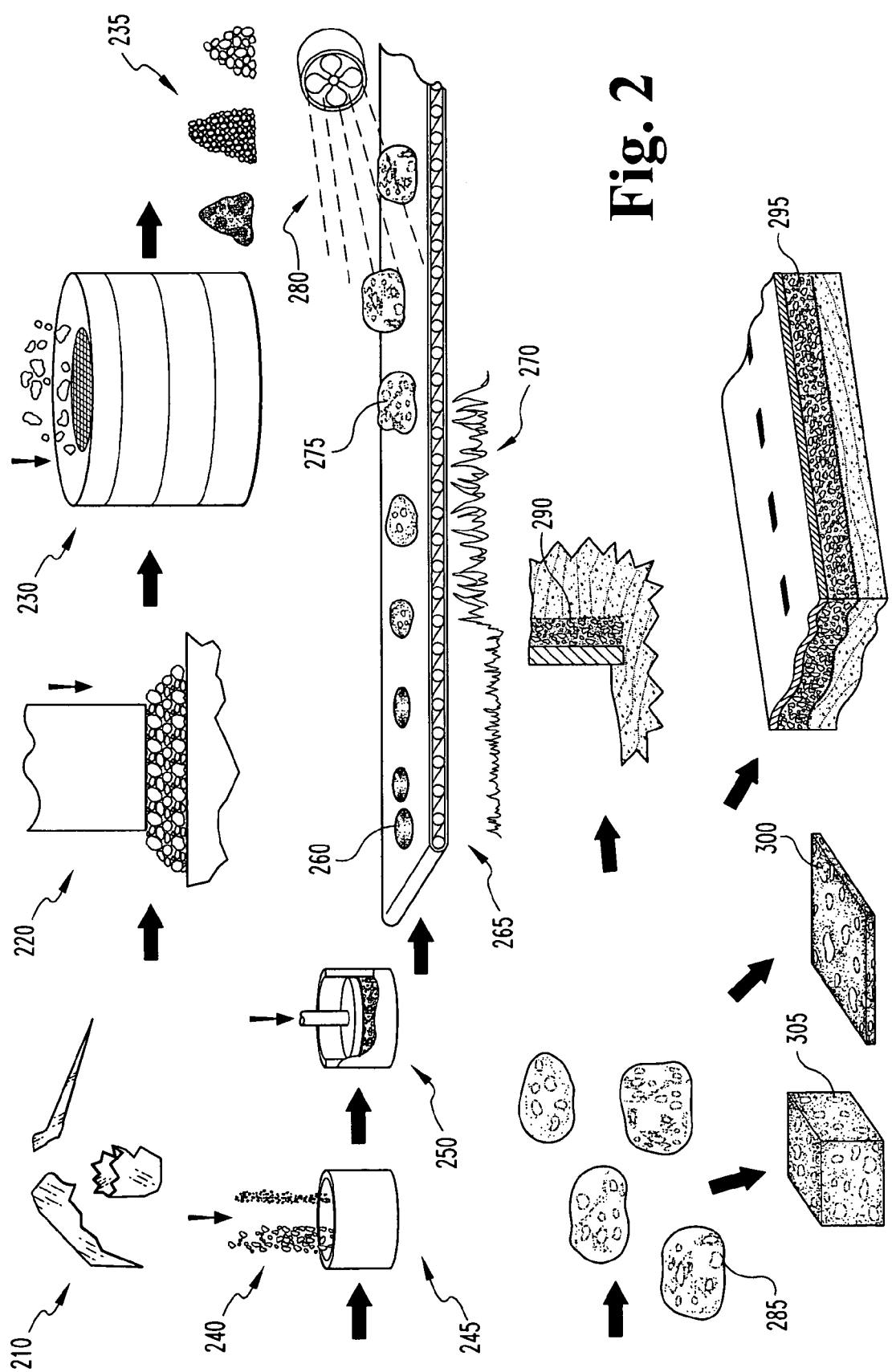
FIG. 2 is a schematic view of a second embodiment of a process for making foamed glass bodies and composites.

For the purposes of promoting an understanding of the principles of the claimed technology and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the claimed technology as illustrated therein being contemplated as would normally occur to one skilled in the art to which the claimed technology relates.

Vitreous materials, such as soda-lime-silica glasses and metallurgical byproduct slags, are typically foamed through a gasification processes to yield a typically predominately vitreous, typically silaceous resultant cellular product. Typically, a foaming precursor is predominately vitreous or non-crystalline prior to the foaming process, since a glassy precursor slag material typically has a viscosity at temperature that is convenient to the foaming process. More typically, the vitreous starting material will have a traditional soda-lime-silica glass composition, but other compositions, such as aluminosilicate glasses, borosilicate glasses, vitreous per-alkaline slag or other vitreous slag compositions may be foamed as well. For example, a peraluminous slag with significant alkali and alkaline earth oxides may also be utilized. After the vitreous precursor is foamed, the foamed glass is physically combined with cement to form a composite material suitable for building or structural applications or the like.

In the case of slagaceous precursor materials, the slag is typically predominately vitreous in character, and more typically has a maximum 40% by volume crystalline material. The slag is typically initially crushed and sized to approximately 10 microns median particle size, more typically at least 90 percent of all particles are less than 75 microns.

If the crushed and/or powdered slag is dry, water is added to the powdered slag to about 0.1 to about 0.5% (by mass). Alternately, if no water is added, limestone or other solid foaming agent may be added (typically about 4 percent or less by mass, more typically about 2 percent or less by mass). The mixture is then formed into pellets (between 0.05 and 1 cubic centimeter), preheated (to no more than within 25° C. of the dilatometric softening point) and then passed through a high temperature zone, such as one generated by a rotary kiln or a flame (contained in a ceramic or refractory metal tube). The residence time in the zone is short, typically about 0.5 to about 10 second, and the temperature is high (adiabatic flame temperature in excess of 1300° C.). However, longer residence times in the high temperature zone, such as 1, 10 or 20 minutes, may be selected. In the case of a flame, the thermal energy provided to the material by the direct flame enables a change of state reaction in the foaming agent and the resulting gas will force the now viscous matter to foam. The foamed pellets or foamed media are air quenched below the dilatometric softening point of the material, and then allowed to dry by slow cooling.

The foamed media typically have a relative volume expansion in excess of three fold, and more typically the volume expansion is as high as 10 fold or greater. This process results in individual, low-density (specific gravity less than 0.3) foamed media with a median pore size in the range of 0.1 to 2 mm.

Composite materials may be prepared by mixing the foamed slag with Portland cement; at least two types of composite materials may be made according to this technique. A first composite material may be prepared by mixing a thin mixture of cement with foamed media, wherein the foamed media comprises at least 85 volume percent of the total cement/other aggregate. The foamed media are typically incorporated into the cement (and aggregates, if needed) after the water has been added. The resulting mixture acts as a very viscous material and is pressure or gravity formed into a slab (or other coherent shape) or direct cast into a prefabricated form. The shape or form is then allowed to set. The resulting composite material sets up to be a rigid, relatively lightweight (specific gravity<0.75) material with surface properties typical of Portland cements. Chemicals and finishing systems compatible with Portland cement can be used in conjunction with this material.

A second composite material is formed as a mixture of cement with typically less than 50 volume percent foamed slag media. The media is typically dry mixed with cement prior to water additions. The mixture is then prepared as common cement. Additional aggregates may be incorporated as per common practice. This second composite material has a very high strength; the composite compressive strength is typically at least 25% higher per unit mass than is that of the identical cement prepared without the foamed slag addition. It can be used in any application compatible with Portland cement.

A third composite material is formed as aqueous slurry mixture comprised of gypsum with typically less than 50 percent by volume foamed glass or slag. The media are typically added to the gypsum after the material is slurried. Additional binders, fillers and setting agents may be added per common practice. The resulting material has a very low density and high acoustic absorption. There are no chemical compatibility limitations on the extent of foamed glass additions. Any limitations typically arise from strength considerations and other physical properties.

In another example, the vitreous precursors 210 to the foaming process are waste glasses. Waste glasses typically have a soda-lime-silica composition, and are generally first crushed or ground 220, and then typically sized 230, to produce a particulate frit 235 suitable for pelletizing 250 or otherwise forming into regular shapes for foaming.

As with slagaceous precursors as described above, if the particulate waste glass 210 is dry, water may be added to the in small amounts to promote handling and to better adhere the foaming agent uniformly to the particles for more even distribution. Alternately, if no water is added, limestone or other solid foaming agent 240 may still be added, typically in small amounts (such as less than 2 percent by mass) and mixed to form a substantially heterogeneous foamable vitreous mixture. The mixture 245 is then typically formed 250 into pellets (between 0.05 and 1 cubic centimeter), loaves, or other regular green bodies 260 convenient for foaming and is next preheated 265, typically to no more than within 25° C. of the dilatometric softening point. Preheating 265 readies the green bodies 260 for rapid heating 270 into the foaming temperature region.

The preheated green bodies 260 are then passed through a high temperature zone 275, such as one generated by a rotary kiln or a flame (contained in a ceramic or refractory metal tube). The residence time in the zone is short, typically about 0.5 to about 10 seconds, but may be longer for larger green bodies 260. The temperature is substantially high (adiabatic flame temperature at least about 1200° C. and typically around 1300° C. or higher). The rapid influx of thermal energy provided to the material enables a change of state reaction in the foaming agent 240 and the resulting gas will force the now viscous matter to foam.

The foamed bodies 275 are then rapidly quenched 280 to below the dilatometric softening point of the material, and then allowed to cool to room temperature at a second, typically slower, cooling rate. The cooling rate is typically rapid enough such that the foamed glass 275 does not anneal or only partially anneals, resulting in a harder foamed glass body 285 with built-in stresses that enhance its crushing strength and toughness, and also give rise to a crushing failure mode in compression and torsion. The cooling rate typically varies due to belt speed. The high end is typically about 15-25° C. per minute, while the low end is typically about 10-20° C. per minute for the temperature range from the foaming temperature to just below the dilatometric softening point; more typically, cooling from the foaming temperature to below the dilatometric softening pint temperature occurs at a rate of about 20 degrees Celsius per minute. The cooling rate typically diminishes as the body 285 approaches the softening point.

After foaming, the bodies 275 leave the kiln and are quenched 280, typically via exposure to air or forced water jacket cooling, and the cooling rate is increased to about 25-40° C. per minute during the rapid quench, more typically at least about 30 degrees Celsius per minute. After the rapid quench, the cooling rate is decreased to about 3-10° C. per minute. All cooling rate values are for the center of the foamed glass bodies 285.

For foamed media produced on a belt process, the pellets or green bodies 260 are typically configured such that the resultant foamed bodies 275, 285 have irregular oblong or ovoid shapes. More typically, the green bodies 260 are preformed or pressed pellets sized such that the resultant foamed bodies 275, 285 have major axis dimensions of between about 10 mm and 80 mm. Accordingly, these bodies 285 are typically sized and shaped to be engineered drop-in replacements for mined gravel aggregate and have superior water management, compressive strength, failure mode, erosion, stackability, chemical stability and toughness properties. Alternately, the foamed bodies 285 may be made to other convenient size and shape specifications, such as in larger orthorhombic parallelepiped or 'brick' shapes, still larger 'cinder block' dimensions, relatively thin plates, and the like.

One advantage of this process is that the furnace residence time of vitreous bodies 275 during the foaming process is reduced a factor of 4-9 over most conventional glass foaming techniques. Moreover, the foamed glass bodies 285 can be produced with mean cell sizes of less than about 0.2 mm in diameter, and with typically individual cells sizes ranging down to about 0.1 mm in diameter or less. Bodies 285 having such small cell sizes are typically of the closed cell type, which gives rise to crushing strengths of well over the typical 100 psi (for comparably dense open cell material) to well over 200 psi. Further, bodies 285 having substantially open cells sized in the less than 0.1-0.2 mm range exhibit enhanced capillary action and accordingly rapidly absorb and efficiently retain water.

The natural break-up of the material under rapid cool down, due to thermally induced stresses, results in a more angular, jagged foamed glass body 285 as opposed to a foamed glass piece shaped by crushing a large body. The physical measure is that the so-produced foamed glass bodies 285 have a range of aspect ratios (largest to smallest diameter) about 50% higher than the 1 to 1.25 ratio average for smaller bodies formed via a crushing process. This gives rise to the 35 degree stacking angle and ensures the material breaks up before slip failure.

In one example, oblong, irregularly shaped foamed bodies 285 produced as described above and having major axial dimensions of about 80 mm are used as fill material 290 behind rock retaining walls. As these fill material bodies are relatively light weight, relatively strong in compression, have a characteristic stacking angle of about 35 degrees and are characterized by an open pore structure, a substantially smaller volume of foamed glass aggregate fill is required as compared to traditional mined gravel. For a 6 foot retaining rock wall, the required foundation thickness is reduced from 54 inches to 24 inches, the required rock is reduced by 7.5 cubic feet per linear foot of wall, and the required concrete is reduced by 2.5 cubic feet per linear foot of wall. The amount of graded fill is reduced from 40 cubic feet per linear foot of wall to 24 cubic feet per linear foot of wall. This reduction is made possible by the high stacking angler (about 35 degrees) of the foamed glass aggregate material 290, the physical manifestation of which is its tendency to fail by a crushing mechanism (shattering of the individual cells) instead of the individual aggregate pieces sliding over themselves. Additionally, the open pore structure of the foamed glass aggregate 285 gives rise to superior drainage and water management properties, reducing or eliminating the need for a separate inlaid drain pipe. In other words, by replacing mined gravel with engineered foamed glass aggregate 290 characterized by a high stacking angle, the amount of fill may be nearly halved and, consequently, the foundation depth and wall thickness may likewise be substantially reduced.

Likewise, the foamed glass aggregate fill may replace traditional mined fill gravel 295 in road beds. Less volume of the foamed glass aggregate fill is required, as it has superior strength, porosity and failure mode characteristics, giving rise to shallower road beds, reduced construction time and expenses, less excavated dirt to be trucked away, reduced energy usage in road construction, simplified road drainage, and the like. Moreover, the roads themselves may be paved over and constructed of concrete including foamed glass aggregate made as described above, which likewise has enhanced strength and decreased weight characteristics.

In another embodiment, the foamed glass bodies produced as described above may be incorporated into acoustic ceiling tiles 300. The foamed glass material is chemically stable and inert, non-toxic, lightweight, and its porosity gives rise to sound-dampening. The tiles may be made entirely of shaped foamed glass (in the form of relatively thin panels), or may incorporate foamed glass particles or bodies in a structural matrix, such as a polymer based, fibrous, cementitious, or like matrix material. Of course, the foamed glass bodies 285 may also be used as aggregate 305 in traditional concrete.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A method of making a composite material having foamed glass aggregate in a structural material matrix, comprising the steps of:
   a) sizing a particulate vitreous precursor material to segregate vitreous particles;
   b) extracting vitreous particles characterized by a predetermined range of size and particle size distribution to yield a pelletizable precursor;
   c) pelletizing the pelletizable precursor with a foaming agent to yield a plurality of foamable vitreous pellets characterized by a dilatometric softening point;
   d) preheating the foamable vitreous pellets to a first temperature about 25 degrees Celsius below the dilatometric softening point;
   e) passing the preheated vitreous pellets through a high-temperature region to foam the pellets to yield a plurality of foamed vitreous bodies;
   f) cooling the foamed vitreous bodies at a first predetermined cooling rate of about 20 degrees Celsius per minute to a second predetermined temperature below the dilatometric softening point; and
   g) cooling the foamed pellets from the second predetermined temperature to a third predetermined temperature at a second predetermined cooling rate of about 40 degrees Celsius per minute to yield foamed glass bodies;
   wherein the high temperature region is at least about 1200° C.; and
   wherein the foamed pellets are characterized by a mean cell diameter of less than about 0.2 mm.

2. The method of claim 1 wherein the foamed glass bodies have a crushing strength of at least about 100 PSI, densities of between about 100 kg/m$^3$ and 180 kg/m$^3$.

3. The method of claim 2 wherein the foamed glass bodies are defined by a stacking angle of about 35 degrees.

4. The method of claim 1 and further comprising:
   h) mixing the foamed pellets with structural material to yield a composite material.

5. The method of claim 1 wherein the composite material has a principal compressive failure mode of crushing and wherein the composite material will preferentially crushingly fail instead of slide over itself under excessive compressive and torsional loads.

6. The method of claim 1 wherein the high temperature region is a belt furnace.

7. The method of claim 6 wherein step e) lasts no longer than about 20 minutes.

8. The method of claim 6 wherein step e) lasts no longer than about 10 minutes.

9. The method of claim 6 wherein step e) lasts no longer than about 1 minute.

10. The method of claim 4 wherein the composite material is a concrete defined by foamed glass bodies suspended in a cementitious matrix.

11. The method of claim 4 wherein the foamed glass bodies comprise road bed aggregate and wherein the composite material is a poured road bed.

12. The method of claim 4 wherein the composite material is a ceiling tile defined by foamed glass particles dispersed in a structural matrix.

13. The method of claim 12 wherein the structural matrix is cementitious.

14. The method of claim 1 wherein the particulate vitreous precursor material is a recycled metallurgical slag.

15. The method of claim 1 wherein the particulate vitreous precursor material is recycled waste glass.

16. The method of claim 1 wherein the foamed pellets are defined by a substantially closed cell structure.

17. The method of claim 1 wherein the foamed pellets are defined by a substantially open structure and wherein the foamed pellets may saturate with about 50 percent water by volume.

18. The method of claim 10 wherein the cementitious material is gypsum, wherein the mixture of gypsum, foamed pellets and water defines a slurry, and wherein the foamed pellets are present with the gypsum in amounts of less than 50 weight percent.

19. The method of claim 10 wherein the cementitious material is Portland cement.

* * * * *